// United States Patent [15] 3,648,120
Hakki [45] Mar. 7, 1972

[54] INDIUM ALUMINUM PHOSPHIDE AND ELECTROLUMINESCENT DEVICE USING SAME

[72] Inventor: Basil W. Hakki, Summit, N.J.

[73] Assignee: Bell Telephone Laboratories Incorporated, Murray Hill, N.J.

[22] Filed: Jan. 16, 1969

[21] Appl. No.: 791,575

[52] U.S. Cl. .......................................317/235 N, 317/234 R
[51] Int. Cl. .......................................................H01l 15/00
[58] Field of Search ............317/235, 235 N, 235 R, 235 AC; 313/108; 148/33; 252/62.3 GA, 301.4 R; 331/94.5

[56] References Cited

UNITED STATES PATENTS 3,560,275 2/1971 Kressel et al...........................148/171
3,436,625 4/1969 Newman................................317/237
3,508,126 4/1970 Newman................................317/235

OTHER PUBLICATIONS

Rupprecht, et al., Applied Physics Letters, Vol. 11, No. 3, Aug. 1967, pages 81–83.
Ivey, H., IEEE Journal of Quantum Electronics, Vol. QE–2, No. 11, Nov. 1966, pages 713–716.

*Primary Examiner*—John W. Huckert
*Assistant Examiner*—Martin H. Edlow
*Attorney*—R. J. Guenther and Edwin B. Cave

[57] ABSTRACT

$(In_{(1-x)}Al_x)P$ compositions wherein $x$ ranges from 0.2 to 0.5 have been found to be amphoteric and manifest electroluminescent properties in the visible portion of the spectrum.

3 Claims, 5 Drawing Figures

Figure 1A:
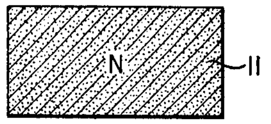

INVENTOR
B. W. HAKKI
BY Edward M. Fink
ATTORNEY

INDIUM ALUMINUM PHOSPHIDE AND ELECTROLUMINESCENT DEVICE USING SAME

This invention relates to compositions useful in electroluminescent devices and to such devices. More particularly, the present invention relates to Group III(a)–V(a) semiconductive compositions and to electroluminescent junction devices utilizing such compositions.

Recently, there has been a birth of interest in a class of junction devices which evidence electroluminescence at the junction. Typically, these devices are capable of producing electroluminescence in the visible range of the spectrum, so suggesting multiple uses in the fields of illumination and information display.

In accordance with the present invention, a technique is described for the growth of Group III(a)–V(a) compositions in the indium-aluminum-phosphorous system which evidence amphoteric properties, that is, they are amenable to being doped either P-type or N-type. The inventive technique also relates to the use of such compositions in novel two-terminal PN-junction devices. Indium aluminum phosphide prepared as described herein has been found to emit light over the range of 1.8 to 2.5 electron volts (6,900 to 5,000 A.) at room temperature.

The invention will be more readily understood by reference to the following detailed description taken in conjunction with the accompanying drawing wherein:

FIGS. 1A through 1E are cross-sectional views in successive stages of manufacture of an electroluminescent junction device of the present invention.

With reference now to the growth process, the first step involves preparing a melt comprising indium, aluminum and phosphorus together with any desired dopant. In accordance with the present invention it has been determined that compositions in the indium-aluminum-phosphorous system evidence amphoteric properties and emit light in the visible portion of the spectrum when the value of $x$ in the general formula $(In_{(1-x)}Al_x)P$ ranges from 0.2 to 0.5. Studies have revealed that compositions in the described system wherein $x$ is less than 0.2 fail to emit light in the visible range whereas composition in which compositions value of $x$ is greater than 0.5 manifest instability and a degradation in radiative efficiency.

The required charge including indium, aluminum, phosphorous and any desired dopant for the purpose of forming either a P- or N-type material is then placed in a graphite or boron nitride boat or other suitable vessel. For the purposes of the present invention, it has been found suitable to use a boat configuration including at least one well (in which there is formed a source solution) and a sliding substrate holder which is capable of depositing the substrate member in the well upon tipping of the apparatus in accordance with conventional solution epitaxy techniques. The specific apparatus employed in accordance with the invention also permits the use of a technique which assures saturation of the source solution during the course of the growth process, such end being effected by placing a source crystal such as indium phosphide in the base of the well member.

Substrate members suitable for use in the practice of the present invention are selected from among those semiconductive materials evidencing a lattice constant within ±10 percent of the lattice constant of indium aluminum phosphide, 5.86 A. Materials found particularly useful for this purpose are indium phosphide, gallium arsenide, etc. A unique procedure for eliminating lattice mismatch and concomitant imperfections involves the use of a gallium arsenide substrate member having deposited thereon a film of indium aluminum phosphide grown in accordance with the invention wherein $x$ in the general formula alluded to above = 0.49. Under those circumstances, the lattice constant of the indium aluminum phosphide is 5.65 A., which is almost identical with the lattice constant of gallium arsenide. Accordingly, it has been found desirable to initially deposit a film of indium aluminum phosphide upon a gallium arsenide substrate in such manner as to result in a substantial match in lattice constants between the materials and continue deposition thereon of indium aluminum phosphide of varying compositions (including dopants). It will be appreciated by those skilled in the art that a PN heterojunction capable of emitting light in the visible portion of the spectrum with a high degree of efficiency may be obtained in the foregoing manner by initially depositing a film of P-type indium aluminum phosphide upon an N-type gallium arsenide substrate, particularly in those instances wherein the lattice constants are essentially the same.

Following, the graphite vessel is inserted in a quartz tube and hydrogen introduced into the system for the purpose of flushing out residual contaminants. Next, the tube is placed in a furnace and with hydrogen flowing is heated for a time period ranging from 30 to 60 minutes in a flat temperature profile to a temperature within the range of 800° to 950° C., so resulting in reaction of the elemental materials to yield an indium melt saturated with indium aluminum phosphide. After reaction, the elements of the system are maintained at the reaction temperature for a time period ranging from 30 to 60 minutes for the purpose of assuring saturation of the source solution. The charge is allowed to cool (10°–15° C.) and at this point the substrate member is deposited upon the source solution and a controlled cooling program initiated at a rate within the range of 1° to 5° per minute, such cooling rate being dictated by considerations relating to the quality of the resultant crystal. Epitaxial growth in accordance with the invention may be effected on substrate materials evidencing diverse orientations. Thus, for example, satisfactory growth may be effected upon the 311, 100 or 111 faces of gallium arsenide, an optimum being found to exist in the case of the 111 face.

A suitable crystal having been prepared, the next step in the inventive process involves the preparation of a two-terminal junction device. As indicated, the crystalline materials grown in the described manner may be doped in any suitable way by the addition of either a donor or acceptor material during the growth process.

Figure 1B:
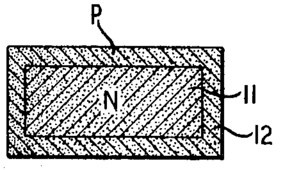
Figure 1C:
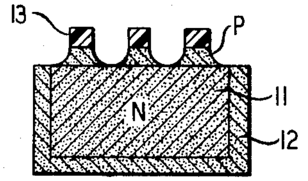
Figure 1D:
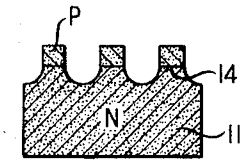
Figure 1E:
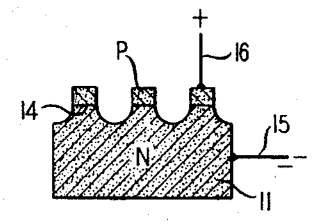

With further reference now to the drawing, FIG. 1A shows an N-type crystal 11 of indium aluminum phosphide prepared as described wherein the dopant may be selected from among tellurium, selenium, tin, etc. As a preliminary step, it is important to rid the surface of the crystal of all traces of undesirable impurities. To this end, the crystal is advantageously etched in methanol-bromine for 10–15 seconds, so preparing it for the formation of a surface diffusion layer of P-type conductivity. The crystal is then loaded into a quartz tube containing a charge of zinc, the tube flamed, evacuated and sealed under vacuum. Then, the tube is heated to a temperature of the order of 750° C. for a time period ranging from ½ to 1 hour. FIG. 1B shows the resultant crystal 11 over whose surface there is formed a P-type diffusion zinc layer 12. Next, mesas 13 (FIG. 1C) are formed upon the surface of layer 12 by conventional photoresistive and chemical etching techniques. Thereafter, the crystal is again etched in a methanol-bromine solution to remove any surface damage, thereby resulting in a structure containing PN-junctions 14 as shown in FIG. 1D. Finally, ohmic contacts 15 and 16 are made to the P- and N-regions, respectively, by conventional procedures, FIG. 1E.

Studies have revealed that at a growth temperature of 800°–825° C. the relationship between the ternary bandgap and the amount of aluminum utilized in the melt is approximately $Eg=1.33+80y$, where $y$ is the atomic ratio of aluminum to indium in the melt. This relationship indicates that for the growth at 800° C. of maximum bandgap direct transition material the atomic fraction of aluminum to indium in the melt should be approximately $1.4\times10^{-2}$, thereby determining the respective amounts of indium and aluminum to be employed in the preparation of source solutions. It will be appreciated by those skilled in the art that for growth temperatures other than 800° C. ranging up to 950° C. that the atomic fraction of aluminum to indium in the melt may be determined by reference to the ternary phase diagram or by thermodynamic calculations based on the value set forth above for 800° C.

An example of the application of the present invention is set forth below. It is intended merely as an illustration and it is to be appreciated that the methods described may be varied by one skilled in the art without departing from the spirit and scope of the invention.

EXAMPLE

An indium aluminum phosphide crystal and electroluminescent junction device were prepared as follows:

1.7 grams of indium, 5 milligrams of aluminum and 1 milligram of tellurium were placed in the well of a boron nitride boat of the type alluded to above, the well of said boat having positioned therein a 1-gram wafer of indium phosphide. Then the boron nitride boat was inserted in a quartz tube and the system flushed with hydrogen. Thereafter, the quartz tube was inserted in an oven and heated at 800° C. for 30 minutes, in a flat temperature profile at which point the source solution was saturated. The source solution was permitted to cool 15° C. and the substrate member placed thereon (with the 111 face facing the solution). Thereafter, a controlled cooling program was initiated at a rate of 1.2° per minute, cooling being continued for 100° C. Thereafter, the boat was removed and permitted to cool to room temperature. The resultant N-type indium aluminum phosphide crystal was then separated from the substrate member by mechanical means and etched in a methanol-bromine solution for 15 seconds and placed in a quartz tube containing 1 gram of zinc. The tube was then flamed, evacuated and sealed under a vacuum after which it was placed in a furnace, heated to 750° C. and maintained thereat for one-half hour. The crystal so produced was then removed from the tube and mesas 10 mils in diameter formed thereon by conventional photoresistive and chemical etching techniques. Then the crystal was etched in methanol-bromine for 45 seconds to remove surface damage and finally metallic point contacts were made to the P- and N-regions, respectively.

In order to demonstrate the efficacy of the device, the leads were connected to a DC source under forward bias conditions, the + lead to the P-region and the − lead to the N-region. At room temperature, at voltages ranging from 1.8 to 2.7 volts, the device was found to emit light centered at about 2.0 electron volts (6,200 A.).

What is claimed is:

1. PN-junction electroluminescent device capable of emitting light in the visible portion of the spectrum including a first region of one conductivity type and a second region of differing conductivity type which forms a PN-junction with said first region together with a pair of electrodes which make ohmic contaCts with said first and second regions, respectively, characterized in that said first and second regions comprise $(In_{(1-x)}$'$AAl_x)P$ wherein $x$ ranges from 0.2 to 0.5.

2. Device in accordance with claim 1 further including a substrate member comprising N-type gallium arsenide.

3. Device in accordance with claim 2 wherein the lattice constants of said N-type gallium arsenide substrate and said first region are essentially the same.

* * * * *